United States Patent

[11] 3,626,808

[72] Inventor Norman EnHolm
P. O. Box 113, Briarcliff Manor, N.Y. 10510
[21] Appl. No. 880,287
[22] Filed Nov. 26, 1969
[45] Patented Dec. 14, 1971

[54] RECIPROCATING ENGINE
7 Claims, 11 Drawing Figs.

[52] U.S. Cl. .................................................. 91/176, 91/187, 91/214
[51] Int. Cl. .................................................. F01b 15/06, F01l 31/14
[50] Field of Search .......................................... 91/214, 187, 176

[56] References Cited
UNITED STATES PATENTS

| | | | |
|---|---|---|---|
| 430,555 | 6/1890 | Wilson .......................... | 91/214 |
| 441,092 | 11/1890 | Case .............................. | 91/214 |
| 672,436 | 4/1901 | Billings ........................ | 91/187 |
| 2,922,402 | 1/1960 | Ballard ........................ | 91/214 |

Primary Examiner—Paul E. Maslousky
Attorney—Eugene E. Geoffrey, Jr.

ABSTRACT: A multicylinder reciprocating engine having pivotally mounted cylinders to permit oscillation of the cylinders during operation of the engine and improved valving means actuated by the motion of the piston to control the flow of steam or compressed gas through the inlet port and means for adjusting the operation of the valving means to modify the power output of the engine.

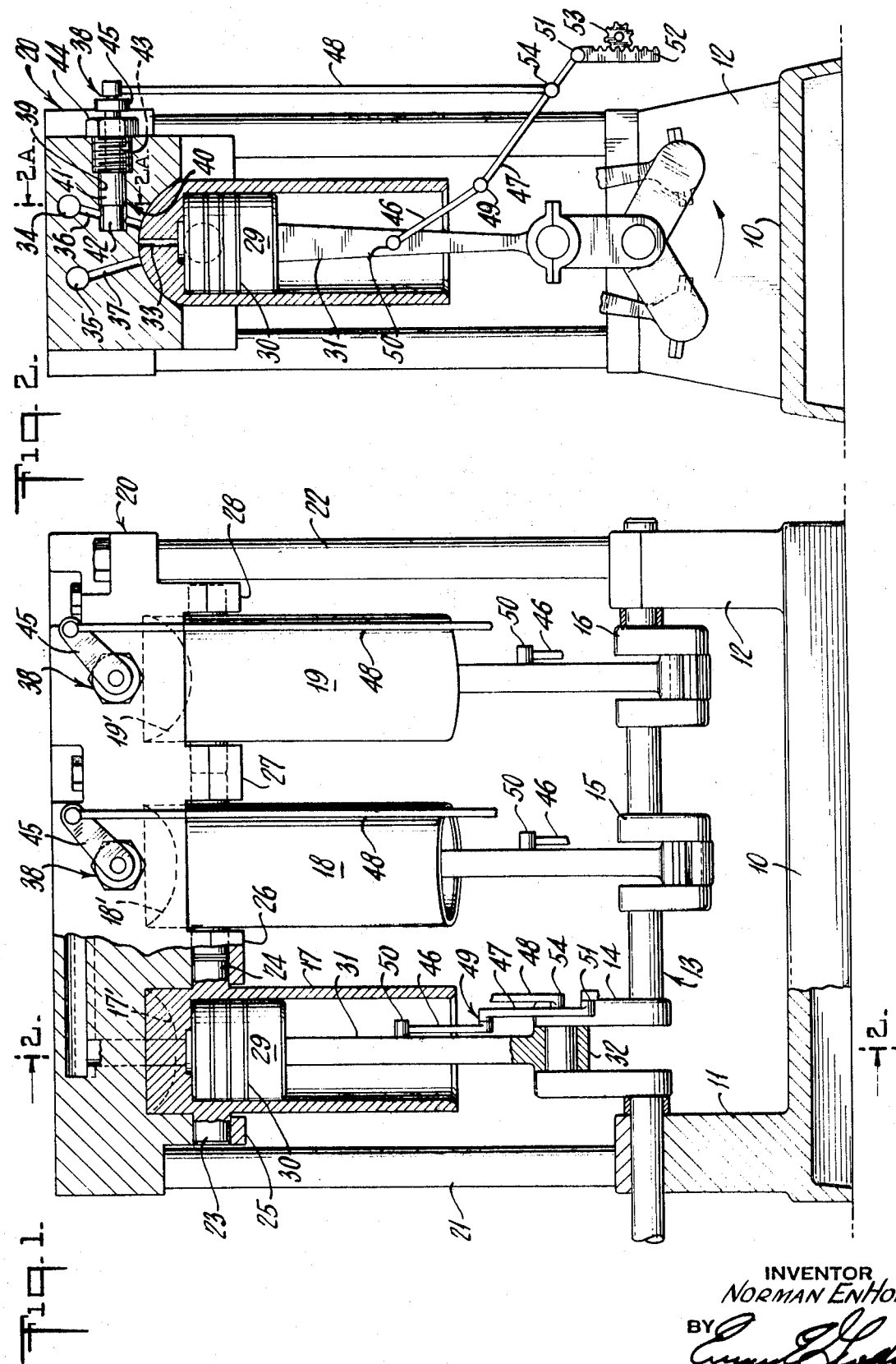

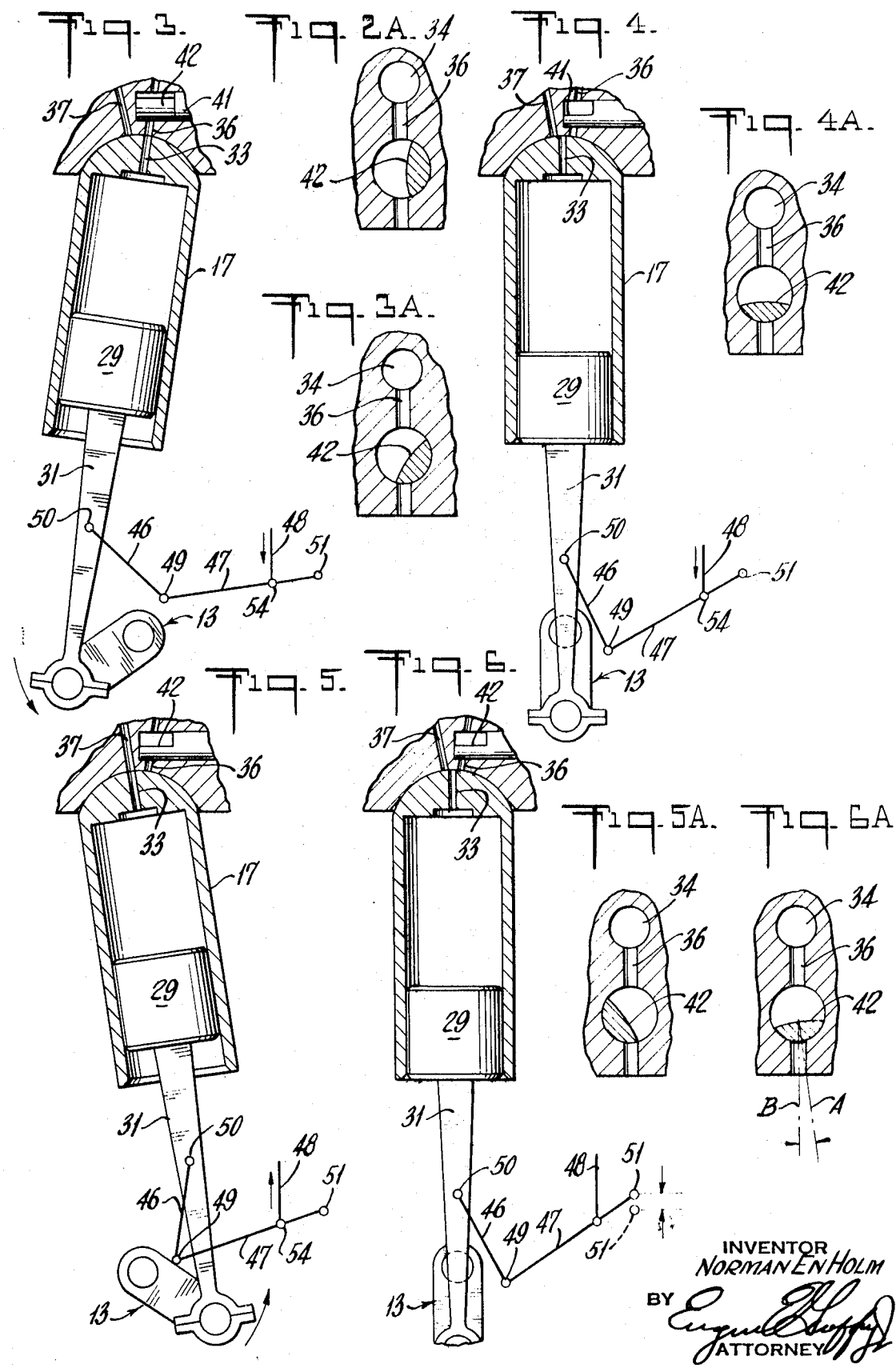

RECIPROCATING ENGINE

This invention relates to reciprocating engines and more specifically to a novel and improved engine adaptable for operation on compressed gases, steam and the like and embodying improved valving means to control the flow of the compressed gas or steam into the engine and at the same time afford means for controlling the power developed by the engine.

Known engines for operation of compressed gas, steam and the like have generally embodied relatively complicated valving means for the admission of gas and steam into the cylinders for operation of the engine with the result that such engines were relatively complicated and expensive to manufacture and maintain. These difficulties have been overcome with this invention which provides a simplified structure embodying an improved valve which not only functions to open and close the inlet port but also can be utilized to control the rate of flow of the compressed gas or steam into the engine cylinders to control the power output of the engine.

These ends are attained in one embodiment of the invention by the utilization of a structure wherein a plurality of cylinders are employed with the piston in each cylinder connected by a rod to a common crankshaft. As the crankshaft is rotated, the cylinders are oscillated in planes normal to the shaft. The upper end of each cylinder is provided with a port which alternately communicates with the fixedly positioned inlet and outlet ports. Each inlet port is controlled by an oscillatory valve actuated by a linkage connected to the piston rod so that the valve will open at the start of the power stroke and will close at the completion of the power stroke. In addition, the linkage can be controlled so that the rate of admission of compressed gas or steam to the cylinder can be modified in order to control the power output of the engine.

The engine in accordance with the invention further embodies an improved construction for supporting the individual cylinders for oscillation and effecting alternate communication of the cylinder port with the inlet and outlet ports.

The above and other objects and advantages of the invention will become more apparent from the following description and accompanying drawings forming part of this application.

In the drawings:

FIG. 1 is a side elevational view in partial section of a three cylinder engine in accordance with the invention;

FIG. 2 is a cross-sectional view taken along the line 2—2 of FIG. 1;

FIG. 2A is a fragmentary cross-sectional view of FIG. 2 taken along the line 2A—2A thereof;

FIG. 3 is a fragmentary cross-sectional view similar to FIG. 2 showing the piston approaching the end of a power stroke with the valve operating mechanism illustrated diagrammatically;

FIG. 3A is a fragmentary cross-sectional view of the valving means similar to FIG. 2A and showing the position of the valve at the end of the power stroke;

FIG. 4 is a cross-sectional view similar to FIG. 3 showing the piston at bottom dead center after completion of the power stroke;

FIG. 4A shows the position of the valving means when the piston is in the position shown in FIG. 4;

FIG. 5 illustrates the position of the piston at the beginning of the exhaust stroke;

FIG. 5A illustrates the position of the valving means at the start of the exhaust stroke;

FIG. 6 is a cross-sectional view similar to FIG. 4.

FIG. 6A illustrates the angular shift of the valving means as a result in the adjustment of the valve linkage as shown in FIG. 6.

The reciprocating engine in accordance with the invention is designed for operation on steam or compressed gases, and while it may utilize any number of cylinders, it is generally preferable to utilize at least three cylinders in order to provide a self-starting engine. One of the difficulties heretofore encountered with steam engines involves the control of the flow of gas pressure or steam into the cylinder with minimum loss of pressure. In a reciprocating engine wherein the cylinders are pivotally mounted as in the illustrated embodiment of the invention, the maintenance of a tight seal to prevent loss of gas pressure between the upper end of the cylinder and the inlet port has presented a difficult problem and prior known structures for minimizing the loss were complicated and expensive. With this invention an improved inlet port valving means is provided which greatly simplifies engine construction and at the same time effectively minimizes loss of steam or gas pressure so that the efficiency of the engine is materially improved.

For convenience the engine now to be described will be referred to as a steam engine, it being understood that the engine may be operated efficiently on any suitable compressed gas. The engine embodies a base 10 carrying bearing blocks 11 and 12 which rotatably carry a crankshaft generally denoted by the numeral 13. In the instant embodiment of the invention three cranks 14, 15 and 16 are provided on the shaft 13 and the cranks are disposed at 120 degree intervals. The cylinders 17, 18, and 19 are pivotally carried by the steam head or manifold generally denoted by the numeral 20 and the manifold is secured to the base by vertical supports 21 and 22 extending upwardly from the bearing blocks 11 and 12.

The manifold 20 is provided with three cylindrically formed recesses 17′, 18′, and 19′ to receive upper ends the cylinders 17, 18, and 19, which are similarly curved to slidably engage the recesses. Each cylinder 17, 18, and 19 includes trunnions 23 and 24 which are held in position on the manifold or steam head 20 by bearing blocks 25, 26, 27, and 28. With this arrangement the cylinders 17 through 19 are carried by the head and at the same time can oscillate about the axes of the trunnions 23 and 24. Each cylinder 17 through 19 includes a piston 29 which may be provided with conventional piston rings 30. The piston 29 in the instant embodiment of the invention has a piston rod 31 fixedly secured to the piston and having a bearing 32 at the lower end to rotatably engage its associated crank.

The upper end of each cylinder 17 through 19 includes a port 33 extending through the cylinder head and the manifold or steam head 20 includes longitudinal ducts 34 and 35. An angularly disposed inlet port 36 connects the duct 34 with each of the recesses 17′ through 19′ and is positioned in such a manner that the inlet port 36 will be aligned with the port 33 when its associated cylinder is angularly disposed as a result of rotation of the crankshaft 13 so that the steam can be admitted to the cylinder and force the piston 29 downwardly to effect rotation of the crankshaft. The duct 35 is also connected by an angularly disposed exhaust port or outlet 37 to each of the recesses 17′ through 19′. Each exhaust port is positioned so that the port 33 of each cylinder will be aligned with its associated exhaust port during the exhaust stroke of the piston in order to discharge steam or gas from within the cylinder.

Control of each of the inlet ports 36 is effected by improved valving means generally denoted by the numeral 38. More specifically, the steam head 20 is provided with three openings 39 extending inwardly from one side thereof and with each opening intersecting an inlet port 36 as may be observed more clearly in FIG. 2. A valve generally denoted by the numeral 40 includes a cylindrical portion 41 rotatably engaging the opening 39 and a valve head 42 in the form of a segment of a circle as may be observed more clearly in FIG. 2A and having an angular width substantially less than 180°. A shaft 43 extends outwardly from the cylindrical portion 41 and a packing nut 44 rotatably and sealably engages the shaft 43 and threadably engages the manifold head 20. The outer end of the shaft 43 carries an arm 45 for rotation of the valve head 42. Operation of the valve is effected by a linkage coupling the piston rod with the lever 45. More specifically, the linkage comprises three links 46, 47, and 48. The links 46 and 47 are pivoted one to the other at 49 while the link 46 is pivoted at 50 to the piston rod. The outer end of the link 47 is pivoted at 51 to a rack 52 which rack is vertically adjustable by a pinion 53 so that the pivot point 51 can be raised or lowered to vary the power developed by the engine. The valve lever 45 is connected by the link 48 to a point 54 on the link 47. The ratios of the lever arms must of course be adjusted to obtain the desired control of the valve head 42. This of course is dependent upon total travel of the piston rod and the angular width of the valve head 42.

The operation of a single cylinder will now be described in connection with FIGS. 3 through 6A. More specifically and with reference to FIG. 3, it will be observed that the piston 29 is approaching the lower end of the power stroke and it effects rotation of the crankshaft 13 in a counterclockwise direction as viewed in this figure. At this point the port 33 is aligned with the inlet port 36 and the linkage has been actuated to move the link 48 downwardly to bring the valve 42 to the position shown in FIG. 3A to close the inlet port 36. This is in effect the termination of the power stroke. When the piston 29 is at bottom dead center as illustrated in FIG. 4, the valve 42 has completely closed the inlet port 36 as shown in FIG. 4A. As the crankshaft continues to rotate the cylinder will tilt in a direction opposite to that shown in FIG. 3, and this position is illustrated in FIG. 5. In this case the port 33 is aligned with the exhaust port 37 so that as the piston 29 travels upwardly it will discharge the steam through the exhaust port 37. After the crankshaft 13 has continued to rotate to bring the piston 29 from the position shown in FIG. 5, slightly passed top dead center, the port 33 will be brought into registry with the inlet port 36 to initiate the next power stroke. The valve head 42 when the piston 29 is in the position shown in FIG. 5 has assumed the position as illustrated in FIG. 5A so that the inlet port 36 remains closed during the exhaust stroke.

To control the gas pressure delivered to the cylinder during the power stroke, the pivot point 41 of the linkage system is shifted vertically by the operation of the rack 52 and pinion 53. The pinion 53 may be operated by any suitable means such as a foot operated pedal, lever, or the like. If the rack 52 is moved downwardly as shown in FIG. 2, the inlet port 36 will be closed at an earlier point in the power stroke, and as a result, the power delivered by the engine is decreased. The displacement of the pivot point modifies the angular position of the valve head 42 relative to the piston as may be observed in FIG. 6A. In this figure the broken line A represents the angular position of the valve head 42 when the pivot point 51 is in the upper position as shown in FIG. 6. When the pivot point 51 is in the upper position as shown in FIG. 6. When the pivot point 51 is moved to the lower position as shown in FIG. 6, the position of the valve head 42 is advanced to the angular position denoted by the broken line B. Thus by merely shifting the pivot point 51 vertically, the power delivered by the engine can be automatically controlled.

It is evident from the foregoing description that the rack 52 and pinion 53 would simultaneously control the valves on each of the cylinders. It is of course understood that any suitable means may be provided for the supply of gas pressure or steam to the duct 34, and the exhaust duct 35 is of course open to the atmosphere. To reverse the operation of the engine any suitable means may be provided for transferring the gas pressure or steam from the duct 34 to the duct 35 in which case the pressure for operation of the engine would be controlled by suitable valving means. If desired, valving means similar to the valve 40 could also be utilized to control the exhaust ports 37 and thereby facilitate control of power during reversing operation. It is also understood that in the illustrated embodiment of the invention when the engine is reversed, the valving means 40 is adjusted to remain in an open position at least during the exhaust stroke and this can be accomplished by means of the rack 52 and pinion 53. It is also to be understood that the engine in accordance with the invention may also be constructed in the form of a V so that a plural number of cylinders in each angularly disposed bank of cylinders would be coupled to the same crankshaft in order to obtain increased power.

While only certain embodiments of the invention have been disclosed, it is apparent that modifications, alterations, and changes may be made without departing from the scope of the invention.

What is claimed is:

1. A reciprocating engine for operation on gas comprising at least one cylinder, a piston within said cylinder, a crankshaft, a piston rod connecting said piston to said crankshaft, a manifold including gas pressure inlet and exhaust ports, a cylinder port extending through a wall of said cylinder, means alternatingly registering said port with said inlet and exhaust ports and valving means controlling the flow of gas pressure from said inlet port to said cylinder port, said valving means including a valve operable to open and close said inlet port, and means connecting said valve with said piston for operation of said valve in synchronism with the movement of said piston, the last said means including means for modifying the synchronous relationship of said valve and piston to modify the power produced by said engine, said manifold including an opening intersecting said inlet port, said valve comprising a cylindrical member rotatably engaging said opening and having a segmental portion extending inwardly of said cylindrical member, a lever arm coupled to said cylindrical member for rotation of said segmental portion and linking means coupling said lever arm to said piston rod to effect oscillatory motion of said segmental portion and alternately open and close said inlet port.

2. A reciprocating engine according to claim 1 wherein said linking means includes a first link pivoted at one end to an adjustable member and coupled at the other end to said piston rod and a second link connecting said lever arm to a point on said first link spaced from said adjustable pivot.

3. A reciprocating engine according to claim 2 wherein said adjustable member includes a rack gear mounted for linear movement and means meshing with said rack gear for movement thereof to effect linear displacement of said rack and modify the power delivered by said engine.

4. A reciprocating engine for operation on gas comprising at least one cylinder, a piston within said cylinder, a crankshaft, a piston rod connecting said piston to said crankshaft, a manifold including gas pressure inlet and exhaust ports, a cylinder port extending through a wall of said cylinder, means alternatingly registering said port with said inlet and exhaust ports and valving means controlling the flow of gas pressure from said inlet port to said cylinder port, said valving means including a valve operable to open and close said inlet port, and means connecting said valve with said piston for operation of said valve in synchronism with the movement of said piston, the last said means including means for modifying the synchronous relationship of said valve and piston to modify the power produced by said engine, said manifold having a cylindrical recess, said cylinder having a closed end portion of convex cylindrical configuration corresponding to the cylindrical configuration of said recess, trunnions extending from each side of said cylinder, bearings engaging said trunnions and holding said cylinder in slidable engagement with said recess, said trunnions being aligned with the axis of curvature of said closed end portion, said inlet and exhaust ports opening into said recess and alternately registering with said cylinder port as said cylinder moves about said trunnions and said piston rod is fixedly secured to said piston whereby rotation of said crankshaft will produce oscillation of said cylinder to permit alternate inlet of gas pressure and exhaust of the expanded gas.

5. A reciprocating engine according to claim 4 wherein said manifold includes an opening intersecting said inlet port, said valve comprises a cylindrical member rotatably engaging said opening and having a segmental portion extending inwardly of said cylindrical member, a lever arm coupled to said cylindrical member for rotation of said segmental portion and linking means coupling said lever arm to said piston rod to effect oscillatory motion of said segmental portion and alternately open and close said inlet port.

6. A reciprocating engine according to claim 5 wherein said linking means includes a first link pivoted at one end to an adjustable member and coupled at the other end to said piston rod and a second link connecting said lever arm to a point on said first link spaced from said adjustable pivot.

7. A reciprocating engine according to claim 6 wherein said adjustable member includes a rack gear mounted for linear movement and means meshing with said rack gear for movement thereof to effect linear displacement of said rack and modify the power delivered by said engine.

* * * * *